United States Patent [19]

Dehne

[11] Patent Number: 4,480,743

[45] Date of Patent: Nov. 6, 1984

[54] CONVEYOR CHAIN AND SUPPORTING BRACKET ASSEMBLY

[75] Inventor: Clarence A. Dehne, Farmington Hills, Mich.

[73] Assignee: Jervis B. Webb Company, Farmington Hills, Mich.

[21] Appl. No.: 343,391

[22] Filed: Jan. 28, 1982

[51] Int. Cl.³ .............................................. B65G 39/20
[52] U.S. Cl. ................................... 198/845; 198/687; 411/124
[58] Field of Search ............... 198/687, 838, 845, 678, 198/712, 731; 104/94, 106, 197, 109, 172 B, 172 BT, 172 S; 403/355, 356, 320; 411/90, 95, 116, 119, 121, 122, 123, 124, 131

[56] References Cited

U.S. PATENT DOCUMENTS

| | | |
|---|---|---|
| 717,321 | 12/1902 | Ball ...................................... 411/123 |
| 1,720,690 | 7/1929 | Preble .................................. 198/687 |
| 1,748,334 | 2/1930 | Evans ................................... 198/731 |
| 4,262,796 | 4/1981 | McDonald ........................... 198/687 |
| 4,320,620 | 3/1982 | Rieger et al. ....................... 198/731 |

FOREIGN PATENT DOCUMENTS 713556  10/1941  Fed. Rep. of Germany ...... 198/678

Primary Examiner—Joseph E. Valenza
Assistant Examiner—Daniel R. Alexander
Attorney, Agent, or Firm—Joseph W. Farley

[57] ABSTRACT

An assembly consisting of a conveyor chain link having sides and ends defining an open center, a supporting bracket having an attachment portion which engages the sides of the link and interlocks longitudinally and transversely within the center of the link, a clamp member engaging the sides of the link opposite to the bracket, and a fastener engaging the bracket and clamp member and extending through the center of the link. The clamp member is interlocked with the link and the bracket by lugs projecting into the center of the link and has tabs deformable into interlocking engagement with the fastener after assembly.

14 Claims, 8 Drawing Figures

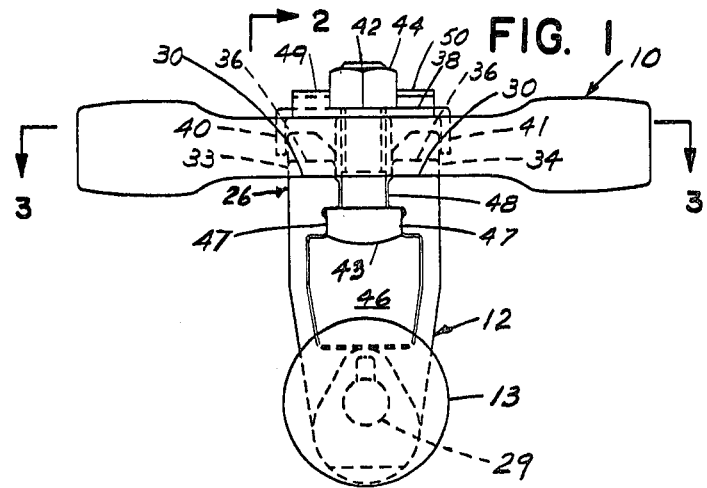
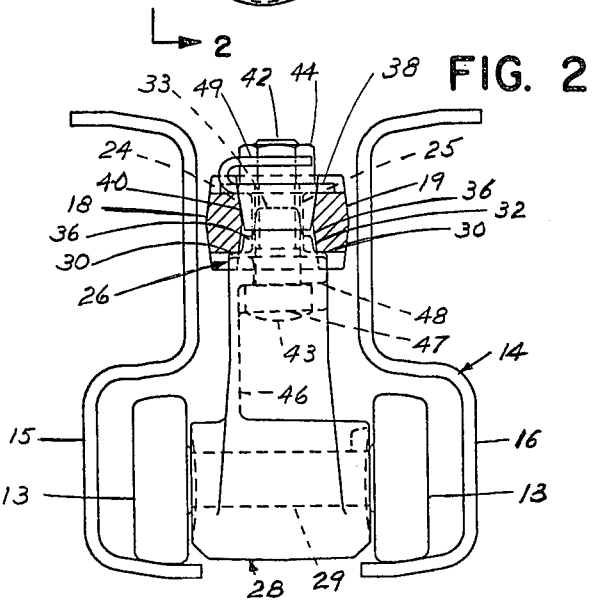
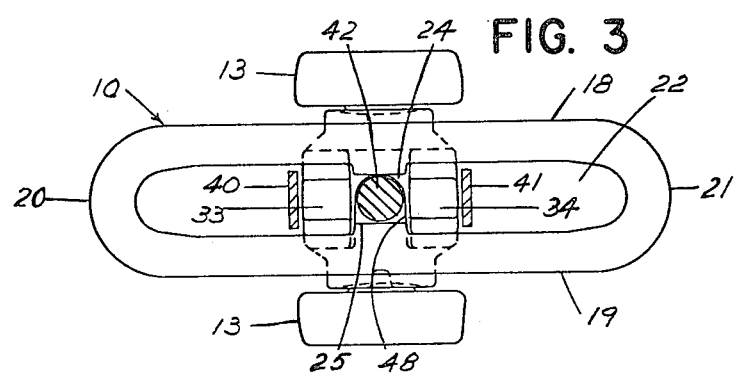

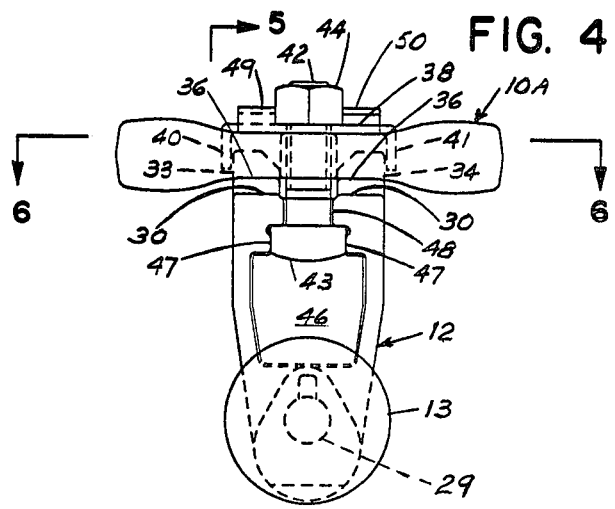
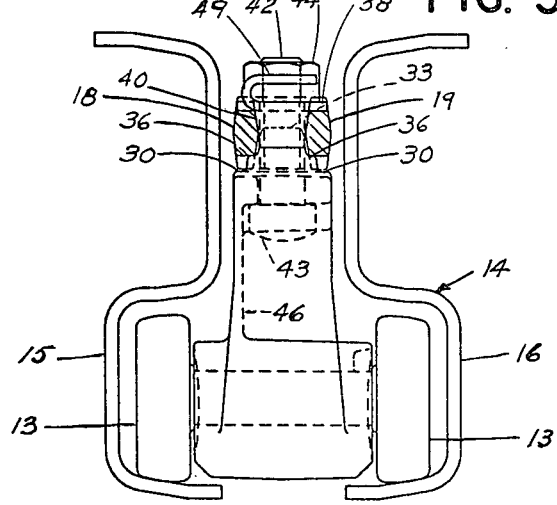
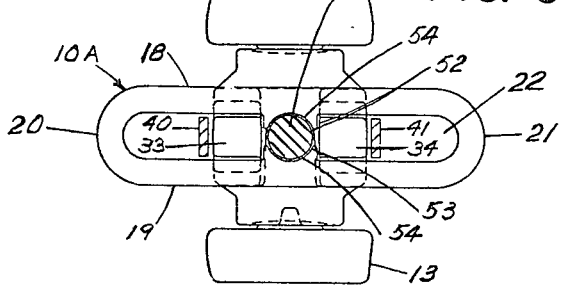

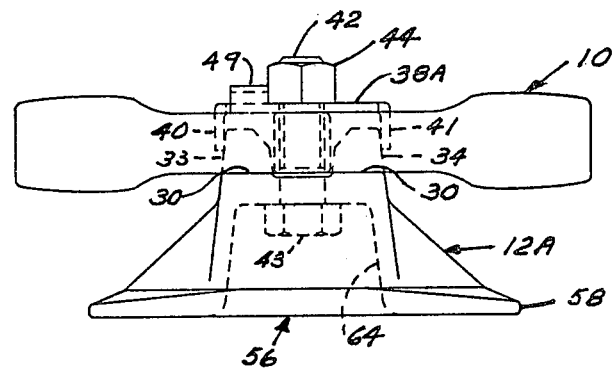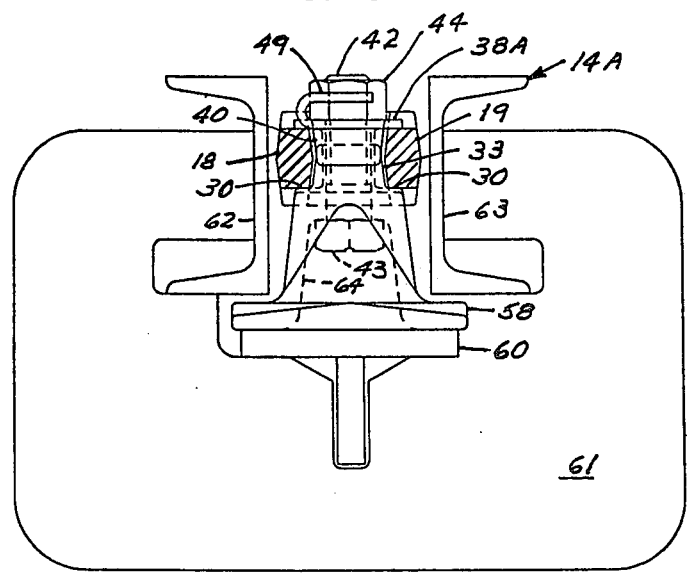

CONVEYOR CHAIN AND SUPPORTING BRACKET ASSEMBLY

This invention relates to improvements in the construction of a conveyor chain and supporting bracket assembly for endless chain conveyors, the assembly being employed repetitively at desired intervals along the length of the conveyor chain, thereby providing a plurality of chain supporting brackets each adapted to travel on a conveyor track.

Conveyor chains conventionally consist of alternate links and side bars connected together by pins, and are manufactured in different sizes so that a chain of proper capacity can be employed according to the requirements of a particular conveyor. Supporting brackets for a conveyor chain are usually attached in pairs to the chain links, as illustrated by U.S. Pat. No. 4,262,796, and a difference in the size of the links requires a corresponding difference in the supporting brackets.

In the chain link and supporting bracket assembly of the present invention, a standardized supporting bracket can be attached to chain links of different size by a simplified connection which positively interlocks the parts and prevents their inadvertent disassembly. This simplified connection tightly clamps the chain link and the supporting bracket together thereby eliminating both the noise and the wear found in connections now commonly employed, in which the parts are loosely interfitted.

The present invention provides a conveyor chain and supporting bracket assembly including a chain link having pairs of transversely spaced sides and longitudinally spaced ends defining an open central portion, and a chain supporting bracket adapted to travel on a conveyor track; wherein, the supporting bracket is formed with an attachment end portion having tranversely spaced first shoulders engaging the sides of the chain link and having a positioning portion projecting between the shoulders into engageable relation with the sides of the chain link within the open central portion thereof; a clamp member engaging the sides of the center link in opposed relation to said first shoulders; fastening means engageable with the supporting bracket and clamp member for clamping the sides of the chain link therebetween, the fastening means extending through the open central portion of the chain link; and the clamp member is provided with a pair of longitudinally spaced lugs projecting into the open central portion of the chain link in overlapping relation with the longitudinally spaced ends of the positioning portion of the supporting bracket.

Preferably, the attachment portion of the supporting bracket is provided with second shoulders which are located outwardly of the first shoulders, are transversely spaced a distance less than the first shoulders, and are adapted to engage the sides of a chain link of different, smaller size. The second shoulders are formed on the positioning portion which comprises a pair of longitudinally spaced outwardly extending projections on the attachment end portion of the bracket. Bosses formed on the sides of the chain link medially between the ends thereof and projecting into the open central portion are engageable between the longitudinally spaced projections of the bracket to provide locating means for fixing the relative position of the bracket longitudinally of the chain link; or alternatively, such locating means comprises arcuate surfaces on the chain link engageable by the fastening means.

The preferred fastening means is a single bolt and nut, one of which is non-rotatably received in a recess in the supporting bracket and the other of which engages the clamp member and, after tightening, is engageable by at least one deformable tab on the clamp member.

In the chain link and supporting bracket assembly resulting from these preferred features, the chain link, the supporting bracket and the clamp member are interlocked with each other in three directions—longitudinally, transversely and perpendicularly thereto—and the fastening means is in turn interlocked with the supporting bracket and the clamp member. Relative movement between the assembled components is positively prevented. Other features and advantages of the invention will appear from the description to follow of the representative embodiments disclosed in the accompanying drawings.

DESCRIPTION OF THE DRAWINGS

FIG. 1 is a side elevation of a conveyor chain and supporting bracket assembly of the invention;

FIG. 2 is a sectional end elevation taken as indicated by the line 2—2 of FIG. 1 and including a conveyor track;

FIG. 3 is a sectional plan view taken on the line 3—3 of FIG. 1, the chain link not being shown in section for clarity;

FIG. 4 is a side elevation similar to FIG. 1 of an alternative assembly employing the same supporting bracket and a smaller size of chain link;

FIG. 5 is a sectional end elevation taken as indicated by the line 5—5 of FIG. 4 and including a conveyor track;

FIG. 6 is a sectional plan view taken on the line 6—6 of FIG. 4 with the chain link shown in full for clarity;

FIG. 7 is a side elevation of an assembly employing an alternative form of supporting bracket; and FIG. 8 is an end elevation, partially in section, of the assembly of FIG. 7 and including a conveyor track.

DESCRIPTION OF THE PREFERRED EMBODIMENTS

The conveyor chain and supporting bracket assembly illustrated in FIGS. 1-3 includes a chain link 10 and a supporting bracket 12 equipped with wheels 13 adapted to travel on a conveyor track 14 formed by transversely spaced track members 15 and 16. The chain link 10, which is similar to the link shown in the aforementioned U.S. Pat. No. 4,262,796, has pairs of transversely spaced sides 18 and 19 and longitudinally spaced ends 20 and 21 defining an open central portion 22. Bosses 24 and 25 are formed on the sides 18 and 19, are located medially longitudinally of the chain link 10 as shown in FIG. 3, and project from the sides 18 and 19 into the open central portion 22.

One end of the supporting bracket 12 is formed with an attachment portion 26; the other end 28 is formed to carry an axle 29 for the track engaging means or wheels 13. The attachment end portion 26 has transversely spaced first shoulders 30 which engage the sides 18 and 19 of the chain link 10 as best shown in FIG. 2, and has a positioning portion 32 projecting between the shoulders 30 into engageable relation with the sides 18 and 19 of the chain link 10 within the open central portion 22 thereof. This positioning portion 32 comprises a pair of longitudinally spaced, outwardly extending projections 33 and 34. When the chain link 10 and the supporting bracket 12 are in assembled relation, the projections 33 and 34 are engageable with the sides 18 and 19 to define the relative transverse positions of the chain link and bracket, and the bosses 24 and 25 on the chain link are also engageable by the projections 33 and 34 to provide a locating means for fixing the relative position of the supporting bracket 12 longitudinally of the chain link 10. The attachment end portion 26 also has second shoulders 36 for a purpose to be described. These second shoulders 36 are located outwardly of the first shoulders 30, are transversely spaced a distance less than the first shoulders 30, and are formed on the projections 33 and 34.

While the bosses 24 and 25 are a presently preferred feature, they are not essential and may be eliminated; or, alternatively, the chain link may be provided with other longitudinally oppositely facing surfaces engageable by the attachment portion 26 of the supporting bracket for fixing the relative position of the supporting bracket longitudinally of the chain link.

A clamp member 38 engages the sides 18 and 19 of the chain link 10 in opposed relation to the first shoulders 30, and is provided with a pair of longitudinally spaced interlocking lugs 40 and 41 which project into the open central portion 22 of the chain link and into overlapping relation with the longitudinally spaced ends of the projections 33 and 34. The lugs 40 and 41 are engageable with the sides 18 and 19 of the chain link to prevent relative transverse and rotational movements of the clamp member 38 and the chain link 10; and, the lugs 40 and 41 are also engageable with the projections 33 and 34 to prevent longitudinal movement of the clamp member 38 relative to the supporting bracket 12 and the chain link 10.

Fastening means, comprising a bolt member 42, having a square head 43, and a nut member 44, engages the supporting bracket 12 and the clamp member 38 for clamping the sides 18 and 19 of the chain link therebetween. As shown in FIGS. 1 and 2, a recess 46 in the supporting bracket 12 has side portions 47 non-rotatably engageable by opposite sides of the head 43 of the bolt 42 which is insertable into the recess 46 through a transverse slot 48 located longitudinally between the first shoulders 30 and the projections 33 and 34. The bolt 42 extends through the open central portion 22 of the chain link 10 longitudinally medially thereof. After the nut 44 has been tightened to securely clamp the parts together in interlocked relation, oppositely facing, deformable tabs 49 and 50 on the clamp member 38 are bent into overlapping engageable relation with the nut 44, thereby preventing inadvertent disassembly.

FIGS. 4-6 illustrate an assembly consisting of the same supporting bracket 12 and a chain link 10A of smaller size than the chain link 10. The sides 18 and 19 of the link 10A are engaged by the second shoulders 36 of the bracket. As shown in FIG. 6, modified bosses 52 and 53 project from the sides 18 and 19 of the link 10A into the open central portion 22 and are provided with opposite, arcuate faces 54 engageable by the bolt 42. The construction of FIGS. 4-6 otherwise corresponds to that of FIGS. 1-3 and offers corresponding features in addition to the difference in chain size. For example, FIGS. 1-3 illustrate a chain of six-inch pitch; FIGS. 4-6 a chain of four-inch pitch.

The assembly of FIGS. 7 and 8 consists of a chain link 10, a modified supporting bracket 12A, and a modified clamp member 38A. The bracket 12A has an attachment end portion which is designed to be intertitted only with the chain link 10 and includes the first shoulders 30 engaging the sides 18 and 19 of the link. The opposite end 56 of the bracket 12A is provided with track engaging means in the form of a rider plate 58 which slidably engages a wear plate 60 mounted on yokes 61 between side guide members 62 and 63 of the track 14A. A recess 64 extends from the rider plate 58 toward the attachment end and non-rotatably receives the head 43 of the fastening bolt 42. A single tab 49 on the clamp member is deformable into engageable relation with the nut 44 to prevent rotation thereof in the direction of disassembly. Otherwise, this construction offers the same features and advantages as the constructions of FIGS. 1-6, and the modifications of FIGS. 7 and 8 to the attachment end of the bracket 12A and to the clamp plate 38A can obviously be employed in the constructions of FIGS. 1-6, particularly in case a different size of supporting bracket is desired for each chain size.

The construction of the supporting brackets 12 and 12A enables them to be manufactured by casting, forging or stamping operations, as desired.

What is claimed is:

1. A conveyor chain and supporting bracket assembly including a chain link having pairs of transversely spaced sides and longitudinally spaced ends defining an open central portion, and a chain supporting bracket adapted to travel on a track; wherein, the supporting bracket is formed with an attachment end portion having transversely spaced first shoulders adapted to engage the sides of a first chain link and having second shoulders located outwardly of said first shoulders, said second shoulders being tranversely spaced a distance less than said first shoulders and being adapted to engage the sides of a second chain link of different size than said first chain link, said attachment end portion having a positioning portion projecting between said first and second shoulders into engageable relation with the sides of one of said first and second chain links within the open central portion thereof;

a clamp member engages the sides of said one chain link in opposed relation to one of said first and second shoulders;

fastening means is engageable with the supporting bracket and clamp member for clamping the sides of said one chain link therebetween, the fastening means extending through the open central portion of said one chain link; and the clamp member is provided with a pair of longitudinally spaced lugs projecting into the open central portion of said one chain link in overlapping relation with the longitudinally spaced ends of the positioning portion of the supporting bracket.

2. A conveyor chain and supporting bracket assembly according to claim 1 wherein the positioning portion comprises a pair of longitudinally spaced outwardly extending projections on the attachment end of the supporting bracket, and said second shoulders are formed on the projections.

3. A conveyor chain and supporting bracket assembly according to claim 1 wherein the positioning portion of the supporting bracket comprises a pair of longitudinally spaced outwardly extending projections on the attachment end portion of the supporting bracket.

4. A conveyor chain and supporting bracket assembly according to claim 3 wherein the fastening means extends through the open central portion of the chain link between said pair of longitudinally spaced projections.

5. A conveyor chain and supporting bracket assembly according to claim 1 or 3 wherein the clamp member is further provided with at least one tab deformable into engageable relation with a portion of the fastening means.

6. A conveyor chain and supporting bracket assembly according to claim 5 wherein the fastening means comprises a bolt member and a nut member, and a recess in the supporting bracket non-rotatably engageable by a portion of one of the bolt and nut members, a portion of the other of the bolt and nut members being engageable by said deformable tab.

7. A conveyor chain and supporting bracket assembly according to claim 1 further comprising locating means for fixing the relative position of the supporting bracket longitudinally of the chain link comprising longitudinally oppositely facing surfaces on the chain link engageable by at least one of the elements consisting of the fastening means and the attachment end portion of the supporting bracket.

8. A conveyor chain and supporting bracket assembly according to claim 7 wherein the positioning portion of the supporting bracket comprises a pair of longitudinally spaced outwardly extending projections on the attachment end portion of the supporting bracket and said locating means comprises a pair of bosses formed on the sides of the chain link, said bosses projecting from the sides into the open central portion, said bosses being located medially longitudinally of the chain link and being engageable by said longitudinally spaced projections of the supporting bracket.

9. A conveyor chain and supporting bracket assembly accordng to claim 8 wherein the end of the supporting bracket opposite to the attachment end is provided with track engaging means.

10. A conveyor chain and supporting bracket assembly according to claim 7 wherein the clamp member is further provided with at least one tab deformable into engageable relation with a portion of the fastening means.

11. A conveyor chain and supporting bracket assembly according to claim 10 wherein the fastening means comprises a bolt member and a nut member, and a recess in the supporting bracket non-rotatably engageable by a portion of one of the bolt and nut members, a portion of the other of the bolt and nut members being engageable by said deformable tab.

12. A conveyor chain and supporting bracket assembly including a chain link having pairs of transversely spaced sides and longitudinally spaced ends defining an open central portion, and a chain supporting bracket adapted to travel on a track; wherein, the supporting bracket is formed with an attachment end portion having transversely spaced first shoulders adapted to engage the sides of a first chain link, and having second shoulders located outwardly of the first shoulders, the second shoulders being transversely spaced a distance less than the first shoulders and being adapted to engage the sides of a second chain link of different size than the first chain link;

said attachment end portion having an integral positioning portion projecting between said first and second shoulders into engageable relation with the sides of one of said first and second chain links within the open central portion thereof;

a clamp member engages the sides of said one chain link in opposed relation to one of said first and second shoulders; and fastening means engageable with the supporting bracket and clamp member for clamping the sides of said one chain link therebetween, the fastening means extending through the open central portion of said one chain link.

13. A conveyor chain and supporting bracket assembly according to claim 12 wherein the clamp member is provided with a pair of longitudinally spaced lugs projecting into the open central portion of said one chain link in overlapping relation with the longitudinally spaced ends of the positioning portion of the supporting bracket, said longitudinally spaced lugs being engageable with the sides of the open central portion of said one chain link for preventing relative movement between the clamp member and said one chain link and being engageable with said longitudinally spaced ends of the positioning portion of the supporting bracket for preventing relative movement between the clamp member and the supporting bracket.

14. A conveyor chain and supporting bracket assembly according to claim 12 wherein said positioning portion comprises a pair of longitudinally spaced outwardly extending projections, said second shoulders being formed on said projections, and locating means for fixing the relative position of the supporting bracket longitudinally of said one chain link, said locating means comprising a pair of bosses formed on the sides of said one chain link and projecting into the open central portion thereof, said bosses being located medially longitudinally of said one chain link and being engageable by said longitudinally spaced projections.

* * * * *